United States Patent [19]

Lausberg et al.

[11] Patent Number: 5,260,375
[45] Date of Patent: Nov. 9, 1993

[54] THERMOPLASTIC MOLDINGS MATERIALS OF IMPROVED GREEN STRENGTH AND LOW-TEMPERATURE TOUGHNESS BASED ON A THERMOPLASTICS POLYURETHANE COPOLYMER MIXTURE, PREPARATION THEREOF AND USE THEREOF

[75] Inventors: Dietrich Lausberg, Ludwighshafen; Klaus Muehlbach, Heppenheim; Uwe Blumenstein, Ludwigshafen; Knud Faehndrich, Diepholz, all of Fed. Rep. of Germany

[73] Assignee: BASF Aktiengesellschaft, Ludwigshafen, Fed. Rep. of Germany

[21] Appl. No.: 660,378

[22] Filed: Feb. 25, 1991

[30] Foreign Application Priority Data

Feb. 23, 1990 [DE] Fed. Rep. of Germany ....... 4005818

[51] Int. Cl.⁵ ............... C08L 75/04; C08L 25/12; C08L 55/02
[52] U.S. Cl. ................................ 525/66; 525/92
[58] Field of Search ..................... 525/66, 92

[56] References Cited

U.S. PATENT DOCUMENTS

| 3,970,717 | 7/1976 | Müller-Albrecht et al. | 525/66 |
| 4,906,687 | 3/1990 | Modic | 525/92 |
| 5,071,910 | 12/1991 | Schepers et al. | 525/66 |

FOREIGN PATENT DOCUMENTS 0319056  6/1989  European Pat. Off. ............. 525/66

Primary Examiner—James J. Seidleck
Assistant Examiner—Thomas Hamilton, III
Attorney, Agent, or Firm—William G. Conger

[57] ABSTRACT

Thermoplastic molding materials of improved green strength and impact toughness at low temperatures which are useful for producing injection moldings and are based on a TPU copolymer mixture, contain, based on 100 parts by weight, A) from 20 to 90 parts by weight of at least one thermoplastic polyurethane,
B) from 1 to 40 parts by weight of at least one elastomeric graft copolymer formed from
   B1) a grafting base comprising an elastomeric polymer having a glass transition temperature of below $-20°$ C. based on butadiene or an acrylate of from 1 to 10 carbon atoms in the alcohol moiety with or without a crosslinker and
   B2) a graft superstratum prepared by single- or multistage copolymerization of styrene, α-methylstyrene, acrylonitrile, methacrylonitrile and methyl methacrylate or of a mixture of at least two of said monomers,
C) from 5 to 75 parts by weight of at least one copolymer prepared by copolymerization of, based on the total weight of (C),
   C1) from 55 to 90% by weight of α-methylstyrene and
   C2) from 10 to 45% by weight of acrylonitrile or methacrylonitrile or a mixture thereof,
D) from 0.1 to 5 parts by weight of at least one copolymer prepared by copolymerization of, based on the total weight of (D),
   D1) from 60 to 99% by weight of styrene and
   D2) from 1 to 40% by weight of at least one olefinically unsaturated monomer having at least one carboxyl, anhydride, tert-butyl ester, hydroxyl or amino group, and
E) from 0 to 60 parts by weight of at least one reinforcing filler, and are prepared by melting together the formative components.

12 Claims, No Drawings

THERMOPLASTIC MOLDINGS MATERIALS OF IMPROVED GREEN STRENGTH AND LOW-TEMPERATURE TOUGHNESS BASED ON A THERMOPLASTICS POLYURETHANE COPOLYMER MIXTURE, PREPARATION THEREOF AND USE THEREOF

The present invention relates to thermoplastic molding materials of improved green strength and low-temperature impact toughness comprising (A) at least one thermoplastic polyurethane, hereinafter abbreviated to TPU,
(B) an elastomeric graft copolymer formed from selected monomers,
(C) an α-methylstyrene, acrylonitrile and/or methacrylonitrile copolymer,
(D) a copolymer of styrene and an olefinically unsaturated monomer having at least one carboxyl, anhydride, tert-butyl ester, hydroxyl or amino group, and optionally,
(E) a reinforcing filler.

Molding materials formed from polyurethane (PU) elastomers and graft rubbers are known. It is also known that the low-temperature flexibility of TPU can be improved by modification with a graft rubber.

For instance, US-A-3 049 505 describes a molding material composed of a crosslinked, solid PU elastomer and ABS rubbers whose graft superstratum comprises polymerized styrene/acrylonitrile units and which have a degree of grafting of greater than 40. According to DE-A-2 854 407 (US-A-4 317 890), thermoplastic molding materials consist of (A) from 75 to 97% by weight of TPU and (B) from 25 to 3% by weight of a graft polymer, the latter being composed of (Ba) from 5 to 35% by weight, based on (B), of one or more graft monomers and (Bb) from 65 to 95% by weight, based on (B), of a grafting-base elastomer component having a glass transition temperature of below −30° C., wherein the entire graft polymer (B) contains less than 50% by weight of the monomers styrene, α-methylstyrene and acrylonitrile, the graft superstratum preferably consists of styrene and acrylonitrile in a weight ratio of from 9:1 to 1:1, and the degree of grafting is from 5 to 35. The molding materials obtained exhibit unsatisfactory impact toughness at low temperatures and are not free of the segregation phenomenon known as the mother of pearl effect. Segregation also reduces the mechanical strength of the molding materials.

To avoid the mother of pearl effect, EP-A-0 152 049 (CA-A-1 231 488) proposes mixing ABS graft rubbers having a grafting base of styrene and acrylonitrile in a weight ratio of from 90:10 to 50:50 and a degree of grafting of from 50 to 70 with a special TPU of low density and a Shore D hardness of from 55 to 80, prepared from selected formative components, in particular from polytetramethylene ether glycol and a mixture of primary and secondary chain extenders in a molar ratio of from 97:3 to 72:28, suitable primary chain extenders being 1,4-butanediol or 1,6-hexanediol and suitable secondary chain extenders being preferably 1,6-hexanediol, 1,4-butanediol, diethylene glycol, di- and tripropylene glycol or hydroquinone di(β-hydroxyethyl ether).

US-A-4 179 479 discloses mixtures of TPU and a thermoplastic polymer selected from the group of the thermoplastic polycarbonates, polyoxymethylenes, acrylonitrile-butadiene-styrene graft polymers, alkylene terephthalates and mixtures thereof, containing polyacrylates having molecular weights of from 500,000 to 1,500,000 as processing aids. Examples of suitable polyacrylates mentioned are polymethyl methacrylates, poly-n-butyl methacrylates, copolymers prepared from methyl methacrylate and ethyl acrylate, and terpolymers prepared from methyl methacrylate, n-butyl acrylate and styrene.

Abstract J 57036141 of JP-A-111399 (dated Feb. 26, 1982) describes thermoplastic molding materials of TPU and a ternary copolymer of styrene, acrylonitrile and a monoolefinically unsaturated monomer, e.g. (meth)acrylic acid, maleic acid, itaconic acid, fumaric acid, maleic anhydride and in particular methyl methacrylate.

However, even these additions do not decisively improve the low-temperature impact toughness of the above-described molding materials, in particular at temperatures of −20° C. or lower. A further disadvantage is the incompatibility between the formative components at the high processing temperatures.

Impact-modified molding materials formed from at least one TPU and an ABS graft copolymer based on α-methylstyrene or an ABS graft copolymer and copolymer based on α-methylstyrene, as described for example in German Patent Applications P 39 08 237.7 and P 39 05 008.4, result in moldings having appreciably improved mechanical properties. However, a disadvantage is the low initial or green strength of the molding immediately after molding. To remedy this disadvantage it is necessary to prolong the cooling time in the mold, thereby increasing the cost of production.

It is an object of the present invention to provide thermoplastic molding materials based on a TPU copolymer mixture which on processing produce moldings having a high green strength and good mechanical properties, in particular a high low-temperature toughness.

We have found, surprisingly, that this object is achieved by adding comparatively small amounts of a certain copolymer of styrene and at least one olefinically unsaturated monomer having at least one carboxyl, anhydride, tert-butyl ester, hydroxyl or amino group to TPU copolymer blends.

The present invention accordingly provides thermoplastic molding materials based on a TPU copolymer mixture which, based on 100 parts by weight, contain or preferably consist of A) from 20 to 90 parts by weight, preferably from 30 to 85 parts by weight, of at least one TPU,
B) from 1 to 40 parts by weight, preferably from 5 to 30 parts by weight, of at least one elastomeric graft copolymer formed from
  B1) a grafting base comprising an elastomeric polymer having a glass transition temperature of below −20° C. based on butadiene or an acrylate having from 1 to 10 carbon atoms in the alcohol moiety with or without a crosslinker and
  B2) a graft superstratum prepared by single- or multistage copolymerization of styrene, α-methylstyrene, acrylonitrile, methacrylonitrile and methyl methacrylate or of a mixture of at least two of said monomers,
C) from 5 to 75 parts by weight, preferably from 10 to 60 parts by weight, of at least one copolymer prepared by copolymerization of, based on the total weight of (C), C1) from 55 to 90% by weight of α-methylstyrene and C2) from 10 to 45% by weight of acrylonitrile or methacrylonitrile or a mixture thereof, D) from 0.1 to 5 parts by weight, preferably from 0.2 to 4 parts by weight, of at least one copolymer prepared by copolymerization of, based on the total weight of (D), D1) from 60 to 99% by weight of styrene and D2) from 1 to 40% by weight of at least one olefinically unsaturated monomer having at least one carboxyl, anhydride, tert-butyl ester, hydroxyl or amino group, it being possible for up to 90% by weight, based on the weight of (D2), of these olefinically unsaturated monomers (D2) to be replaced by acrylonitrile, and E) from 0 to 60 parts by weight, preferably from 2 to 50 parts by weight, of at least one reinforcing filler.

The present invention further provides a process for preparing thermoplastic molding materials of improved green strength and low-temperature toughness based on a TPU copolymer mixture by melting together the formative components (A) to (D) and optionally the reinforcing filler component (E) in a customary mixing apparatus, preferably an extruder, at 190°–250° C. in the course of a residence time of from 0.5 to 10 minutes, and the method of using the thermoplastic molding materials prepared according to the present invention based on TPU copolymer mixtures for producing moldings, preferably injection moldings.

By adding the copolymer (D) it is possible to improve the green strength of the moldings appreciably without thereby adversely affecting the other mechanical properties. It is also worth noting the improved notched impact strength of the moldings at low temperatures and the improved processibility of the molding materials, in particular in injection molding, no separation of the formative components occurring in the melt or in the molding. The produced moldings have excellent surface characteristics.

A) The formative component (A) of the thermoplastic molding materials according to the present invention comprises, as mentioned, from 20 to 90 parts by weight, preferably from 30 to 85 parts by weight, in particular from 45 to 75 parts by weight, based on 100 parts by weight of the molding material, of one or more, preferably one, TPU (A).

The TPUs (A) which are usable according to the present invention conform to the state of the art and can be prepared by reacting a) organic, preferably aromatic, diisocyanates, in particular 4,4'-diphenylmethane diisocyanate, with b) polyhydroxy compounds, preferably essentially linear polyhydroxy compounds, having molecular weights of from 500 to 8000, in particular polyalkylene glycol polyadipates having from 2 to 6 carbon atoms in the alkylene moiety and molecular weights of from 500 to 6000 or hydroxyl-containing polytetrahydrofuran having a molecular weight of from 500 to 3500, and c) diols as chain extenders having molecular weights of from 60 to 400, in particular 1,4-butanediol, in the presence of d) catalysts and optionally e) aids and/or f) additives at elevated temperatures.

The formative components (a) to (d) and optionally (e) and/or (f) may be described in detail as follows:

a) Suitable organic diisocyanates (a) are for example aliphatic, cycloaliphatic and preferably aromatic diisocyanates. Specific examples are: aliphatic diisocyanates such as 1,6-hexamethylene diisocyanate, 2-methyl-1,5-pentamethylene diisocyanate, 2-ethyl-1,4-butylene diisocyanate and mixtures of at least two of said aliphatic diisocyanates, cycloaliphatic diisocyanates such as isophorone diisocyanate, 1,4-cyclohexane diisocyanate, 1-methyl-2,4-cyclohexane diisocyanate and 1-methyl-2,6-cyclohexane diisocyanate and the corresponding isomeric mixtures, 4,4'-, 2,4'- and 2,2'-dicyclohexylmethane diisocyanate and the corresponding isomeric mixtures and preferably aromatic diisocyanates such as 2,4-toluylene diisocyanate, mixtures of 2,4- and 2,6-toluylene diisocyanate, 4,4'-, 2,4'- and 2,2'-diphenylmethane diisocyanate, mixtures of 2,4'- and 4,4'-diphenylmethane diisocyanate, urethane-modified liquid 4,4'- and/or 2,4'-diphenylmethane diisocyanates, 4,4'-diisocyanato-1,2-diphenylethane, mixtures of 4,4'-, 2,4'-and 2,2,-diisocyanato-1,2-diphenylethane, preferably those having a 4,4'-diisocyanato-1,2-diphenylethane content of at least 95% by weight, and 1,5-naphthylene diisocyanate. Preference is given to using diphenylmethane diisocyanate isomer mixtures having a 4,4'-diphenylmethane diisocyanate content of greater than 96% by weight and in particular essentially pure 4,4'-diphenylmethane diisocyanate.

The organic diisocyanates may be replaced to a minor extent, for example in an amount of up to 3 mol %, preferably up to 1 mol %, based on the organic diisocyanate, by a trifunctional or more highly functional polyisocyanate, the amount of which, however, must be limited in such a way as to produce a still thermoplastic polyurethane. A major amount of such tri- or more highly functional isocyanates is advantageously balanced by the inclusion of less than difunctional compounds having reactive hydrogen atoms, in order that excessive chemical crosslinking of the polyurethane may be avoided. Examples of more than difunctional isocyanates are mixtures of diphenylmethane diisocyanates and polyphenylpolymethylene polyisocyanates, so-called crude MDI, and liquid 4,4'-and/or 2,4'-diphenylmethane diisocyanates modified with isocyanurate, urea, biuret, allophanate, urethane and/or carbodiimide groups.

Suitable monofunctional compounds having reactive hydrogen atoms which are also usable as molecular weight regulators are for example: monoamines such as butylamine, dibutylamine, octylamine, stearylamine, N-methylstearylamine, pyrrolidone, piperidine and cyclohexylamine and monoalcohols such as butanol, amyl alcohol, 1-ethylhexanol, octanol, dodecanol, cyclohexanol and ethylene glycol monoethyl ether.

b) Preferred polyhydroxy compounds (b) having molecular weights of from 500 to 8000 are polyetherols and in particular polyesterols. However, it is also possible to use other hydroxyl-containing polymers containing ether or ester groups as bridge members, for example polyacetals, such as polyoxymethylenes and in particular water-soluble formals, e.g. polybutanediol formal and polyhexanediol formal, and polycarbonates, in particular those formed from diphenyl carbonate and 1,6-hexanediol, prepared by transesterification. The polyhydroxy compounds must be at least predominantly linear, i.e. difunctional within the meaning of the isocyanate reaction. The polyhydroxy compounds mentioned may be used as individual components or in the form of mixtures.

Suitable polyetherols can be prepared from one or more alkylene oxides having from 2 to 4 carbon atoms in the alkylene moiety in a conventional manner, for example by anionic polymerization with alkali metal hydroxides, such as sodium hydroxide or potassium hydroxide, or alkali metal alcoholates, such as sodium methoxide, sodium ethoxide, potassium ethoxide or potassium isopropoxide, as catalysts and in the presence of at least one initiator molecule which contains 2 or 3, preferably 2 reactive hydrogen atoms, or by cationic polymerization with Lewis acids, such as antimony pentachloride, boron fluoride etherate, etc. or bleaching earth, as catalysts.

Preferred alkylene oxides are for example tetrahydrofuran, 1,3-propylene oxide, 1,2-butylene oxide, 2,3-butylene oxide and in particular ethylene oxide and 1,2-propylene oxide. The alkylene oxides may be used individually, alternately in succession or as mixtures. Suitable initiator molecules are for example: water, organic dicarboxylic acids, such as succinic acid, adipic acid and/or glutaric acid, alkanolamines, such as ethanolamine, N-alkylalkanolamines, N-alkyldialkanolamines, e.g. N-methyl- and N-ethyl-diethanolamine, and preferably dihydric alcohols which may contain ether linkages, e.g. ethanediol, 1,2-propanediol, 1,3-propanediol, 1,4-butanediol, diethylene glycol, 1,5-pentanediol, 1,6-hexanediol, dipropylene glycol, 2-methyl-1,5-pentanediol and 2-ethyl-1,4-butanediol. The initiator molecules may be used individually or as mixtures.

Preference is given to using polyetherols from 1,2-propylene oxide and ethylene oxide in which more than 50%, preferably from 60 to 80%, of the OH groups are primary hydroxyl groups and where at least some of the ethylene oxide units are present as a terminal block. Such polyetherols can be obtained by, for example, polymerizing onto the initiator molecule first the 1,2-propylene oxide and then the ethylene oxide, or first the entire 1,2-propylene oxide mixed with some of the ethylene oxide and then the remainder of the ethylene oxide, or step by step first some of the ethylene oxide, then the entire 1,2-propylene oxide and then the remainder of the ethylene oxide.

Other preferred possibilities are the hydroxyl-containing polymerization products of tetrahydrofuran, preferably those having molecular weights of not more than 3500.

The essentially linear polyetherols have molecular weights of from 500 to 8000, preferably from 600 to 6000, in particular from 800 to 3500. They can be used not only individually but also in the form of mixtures with one another.

Suitable polyesterols may be prepared for example from dicarboxylic acids of from 2 to 12, preferably from 4 to 6, carbon atoms and polyhydric alcohols. Suitable dicarboxylic acids are for example: aliphatic dicarboxylic acids, such as succinic acid, glutaric acid, adipic acid, suberic acid, azelaic acid and sebacic acid, and aromatic dicarboxylic acids, such as phthalic acid, isophthalic acid and terephthalic acid. The dicarboxylic acids can be used individually or as mixtures, for example in the form of a mixture of succinic acid, glutaric acid and adipic acid. To prepare the polyesterols it may be advantageous to use instead of the dicarboxylic acids the corresponding dicarboxylic acid derivatives, such as dicarboxylic monoesters or diesters having from 1 to 4 carbon atoms in the alcohol moiety, dicarboxylic anhydrides or dicarbonyl dichlorides. Examples of polyhydric alcohols are alkanediols and glycols of from 2 to 10, preferably from 2 to 6, carbon atoms, such as ethanediol, diethylene glycol, 1,4-butanediol, 1,5-pentanediol, 1,6-hexanediol, 1,10-decanediol, 2,2-dimethylpropane-1,3-diol, 1,3-propanediol and dipropylene glycol. Depending on the properties which are desired, the polyhydric alcohols may be used alone or optionally mixed with one another.

It is also possible to use esters of carbonic acid with the diols mentioned, in particular those of from 4 to 6 carbon atoms, such as 1,4-butanediol and/or 1,6-hexanediol, condensation products of ω-hydroxycarboxylic acids, e.g. ω-hydroxycaproic acid, and preferably polymerization products of lactones, for example substituted or unsubstituted ω-caprolactones.

Preferred polyesterols are ethanediol polyadipates, 1,4-butanediol polyadipates, ethanediol/1,4-butanediol polyadipates, 1,6-hexanediol/neopentylglycol polyadipates, 1,6-hexanediol/1,4-butanediol polyadipates and polycaprolactones.

The polyesterols have molecular weights of from 500 to 6000, preferably from 800 to 3500.

c) Suitable chain extenders (c) having molecular weights of from 60 to 400, preferably from 60 to 300, are preferably aliphatic diols of from 2 to 12 carbon atoms, preferably of 2, 4 or 6 carbon atoms, e.g. ethanediol, 1,6-hexanediol, diethylene glycol, dipropylene glycol and in particular 1,4-butanediol. However, it is also possible to use diesters of terephthalic acid with glycols of from 2 to 4 carbon atoms, e.g. bisethylene glycol terephthalate, 1,4-butanediol terephthalate, and hydroxyalkylene ethers of hydroquinone, e.g. 1,4-di-($\beta$-hydroxyethyl)-hydroquinone, and also polyoxytetramethylene glycols having molecular weights of from 162 to 378.

To set the hardness and the melt flow index, the formative components can be varied within relatively wide molar ratios bearing in mind that the hardness and melt viscosity increase with an increasing level of chain extenders (c) while the melt flow index decreases.

To prepare the TPUs (A), the essentially difunctional polyhydroxy compounds (b) and diols (c) are advantageously used in molar ratios of from 1:3 to 1:12, preferably from 1:6 to 1:12, so that the resulting TPUs have a Shore D hardness of from 40 to 80, preferably from 40 to 75.

d) Suitable catalysts, in particular for the reaction between the NCO groups of the diisocyanates (a) and the hydroxyl groups of the formative components (b) and (c), are the customary tertiary amines known from the prior art, such as triethylamine, dimethylcyclohexylamine, N-methylmorpholine, N,N'-dimethylpiperazine, diazabicyclo[2.2.2]octane and the like, in particular organic metal compounds such as titanic esters, iron compounds, tin compounds, e.g. tin diacetate, tin dioctoate, tin dilaurate or the tin dialkyl salts of aliphatic carboxylic acids such as dibutyltin diacetate, dibutyltin dilaurate and the like. The catalysts are customarily used in amounts of from 0.001 to 0.1 part by weight per 100 parts by weight of the mixture of polyhydroxy compounds (b) and diols (c).

In addition to catalysts, the formative components may also contain aids (e) and/or additives (f). Examples are lubricants, inhibitors, stabilizers against hydrolysis, light, heat or discoloration, flame retardants, dyes, pigments, inorganic and/or organic fillers and reinforcing agents.

The aids (e) and/or additives (f) may be introduced into the formative components or into the reaction mixture for preparing the TPUs (A). Alternatively, the aids (e) and/or additives (f) may be mixed with at least one of the formative components (A) to (D) to prepare the molding material according to the invention and then melted, or they are incorporated directly into the melt of components (A) to (D). The latter method is adopted in particular for incorporating the reinforcing fillers (E).

Where, in what follows, no details are provided concerning the usable aids or additives, they can be discerned from the relevant technical literature, for example J. H. Saunders and K. C. Frisch's monograph, High Polymers, volume XVI, Polyurethanes, parts 1 and 2 (Interscience Publishers 1962 and 1964 respectively), Kunststoff Handbuch, volume 7, Polyurethanes, 1st and 2nd editions (Carl Hanser Verlag 1966 and 1983 respectively), or DE-A-2,901,774.

To prepare the TPUs, the formative components (a), (b) and (c) are made to react in the presence of catalysts (d) and in the presence or absence of aids (e) and/or additives (f) in such amounts that the equivalence ratio of NCO groups of diisocyanate to the sum total of hydroxyl groups of components (b) and (c) is from 0.80 to 1.20:1, preferably from 0.95 to 1.05:1, in particular approximately 1:1.

The TPUs (A) which are usable according to the present invention and which customarily contain from 8 to 20% by weight, preferably from 8 to 16% by weight, based on the total weight, of urethane groups and have a melt flow index at 210° C. under a load of 211.8 N (21.6 kp) of from 500 to 1, preferably from 100 to 1, can be prepared by the extruder technique or preferably the belt technique by batchwise or continuous mixing of formative components (a) to (d) and optionally (e) and/or (f), reacting the mixture in an extruder or on a support belt at from 60° to 250° C., preferably at from 70° to 150° C., and then granulating the resulting TPUs (A). It may be advantageous to heat the resulting TPU (A) at from 80° to 120° C., preferably at from 100° to 110° C., for a period of from 1 to 24 hours before further processing into the TPU molding materials according to the present invention.

The TPUs (A) are, as mentioned, preferably prepared by the belt technique. To this end, the formative components (a) to (d) and optionally (e) and/or (f) are continuously mixed with the aid of a mixing head at above the melting point of formative components (a) to (c). The reaction mixture is brought out onto a support, preferably a conveyor belt, for example a metal belt, and is passed at 1-20 m/min, preferably 4-10 m/min, through a hot zone from 1 to 20 m, preferably from 3 to 10 m, in length. The temperature in the hot zone is 60°-200° C., preferably 80°-180° C. Depending on the diisocyanate content of the reaction mixture, the reaction is controlled by cooling or heating in such a way that at least 90%, preferably at least 98%, of the isocyanate groups of the diisocyanates react and the reaction mixture solidifies at the chosen reaction temperature. Owing to the free isocyanate groups in the solidified reaction product, which based on the total weight are within the range from 0.05 to 1% by weight, preferably from 0.1 to 0.5% by weight, the TPUs (A) obtained have a very low melt viscosity or a high melt flow index.

B) Formative component (B) of the thermoplastic molding materials according to the present invention comprises, as already mentioned, from 1 to 40 parts by weight, preferably from 5 to 30 parts by weight, in particular from 10 to 25 parts by weight, based on 100 parts by weight of molding material, of one or more, preferably one, elastomeric graft copolymer (B) formed from B1) a grafting base comprising an elastomeric polymer having a glass transition temperature of below $-20°$ C. based on butadiene or an acrylate having 1 to 10 carbon atoms in the alcohol moiety with or without a crosslinker and B2) a graft superstratum prepared by single- or multistage copolymerization of styrene, $\alpha$-methylstyrene, acrylonitrile, methacrylonitrile and methyl methacrylate or of a mixture of at least 2 of said monomers.

Suitable graft rubbers based on butadiene preferably have a glass transition temperature of below $-40°$ C., in particular of below $-50°$ C., ensuring high impact toughness even at low temperatures, and are composed of a grafting base (B1) which advantageously consists of a polybutadiene, a polyisoprene, a butadiene-styrene copolymer or a copolymer of styrene or an alkylstyrene, e.g. $\alpha$-methylstyrene, and conjugated dienes (high impact polystyrenes), and a graft superstratum (B2) formed in a single stage or else in up to 4 stages from one or more of the aforementioned monomers. Graft rubbers of this type are described for example in DE-A-16 94 173 (US-A-3 564 077) and DE-A-23 48 377 (US-A-3 919 353). It is also possible to use ABS polymers as described for example in DE-A-20 35 390 (US-A-3 644 574), DE-A-22 48 242 (GB-A-1 409 275) and EP-A-22 216, the ABS polymers of EP-A-22 216 being particularly preferred.

Suitable graft rubbers based on acrylate are composed of a grafting base (B1), comprising an acrylate rubber having a glass transition temperature of below $-20°$ C., and a graft superstratum (B2), prepared by graft polymerization of at least one polymerizable ethylenically unsaturated monomer whose homopolymer or copolymers formed in the absence of the grafting base would have a glass transition temperature of more than 35° C.

The acrylate rubbers (B1) which come into consideration for use as grafting bases are preferably polymers of alkyl acrylates or methacrylates which may contain up to 40% by weight, based on the total weight, of units of other polymerizable, ethylenically unsaturated monomers. The preferred polymerizable alkyl acrylates include those having from 1 to 10 carbon atoms in the alkyl moiety, e.g. methyl, ethyl, butyl, octyl or 2-ethylhexyl acrylate. It is also possible to use haloalkyl acrylates, preferably halo-$C_1$-$C_8$-alkyl acrylates, e.g. chloroethyl acrylate, and arylalkyl acrylates, e.g. benzyl or phenylethyl acrylate. The alkyl acrylates mentioned can be used individually or in the form of mixtures.

The acrylate rubbers may be uncrosslinked, completely crosslinked or preferably partially cross-linked.

The crosslinking may be brought about by copolymerizing the alkyl acrylates with suitable monomers which have more than one copolymerizable double bond. Examples of such crosslinking monomers are carboxylic esters prepared from olefinically unsaturated monocarboxylic acids of from 3 to 8 carbon atoms and olefinically unsaturated monohydric alcohols of from 3 to 12 carbon atoms or saturated at least dihydric, preferably dihydric, trihydric or tetrahydric, alcohols of from 2 to 20 carbon atoms, e.g. allyl methacrylate or an alkylene glycol di(meth)acrylate. It is also possible to use polyunsaturated heterocyclic compounds, such as trivinyl or triallyl cyanurate or isocyanurate, trisacryloyl-s-triazines, polyfunctional vinyl compounds, e.g. di- and trivinylbenzene and also triallyl phosphate, dicyclodihydropentadienyl acrylate or/and diallyl phthalate.

It is particularly advantageous and hence preferable to use butanediol diacrylate, dicyclopentadienyl acrylate and butadiene.

Suitable crosslinking monomers are described for example in DE-A-27 26 256 and EP-A-50 265.

The amount of crosslinking monomer is preferably from 0.02 to 10% by weight, in particular from 0.05 to 2% by weight, based on the weight of the grafting base.

If cyclic crosslinking monomers having at least three ethylenically unsaturated groups are used, it is advantageous to limit their amount to a maximum of 1% by weight of the grafting base.

Other suitable polymerizable ethylenically unsaturated monomers which may be used for preparing the grafting base besides alkyl acrylates are for example (meth)acrylonitrile, styrene, α-methylstyrene, (meth)acrylamides and vinyl $C_1$-$C_6$-alkyl ethers.

The acrylate rubbers preferably used as grafting base are emulsion polymers which have a gel content of 60% by weight, measured at 25° C. in dimethylformamide (M. Hoffmann, H. Krömer, R. Kuhn, Polymeranalytik I und II, Georg-Thieme-Verlag Stuttgart 1977).

The grafting base may also be an acrylate rubber with a core comprising a diene rubber formed from one or more conjugated dienes, such as polybutadiene, or a copolymer of a conjugated diene with an ethylenically unsaturated monomer, such as styrene and/or acrylonitrile. Acrylate rubbers of this type are described for example in EP-A-50 262.

The polydiene core content of the grafting base may range from 0.1 to 50% by weight, preferably from 10 to 40% by weight, based on the grafting base. Here the grafting base and the graft superstratum or sheath may each be independently of the other uncrosslinked or partially or completely crosslinked.

Particularly preferred grafting bases for polyacrylate-based graft rubbers are thus: alkyl acrylate homopolymers and copolymers without a core of diene rubber and alkyl acrylate homopolymers and copolymers with a core of diene rubber.

Monomers for forming the graft superstratum (B2) in one or more stages are styrene, α-methylstyrene, acrylonitrile, methacrylonitrile and methyl methacrylate or mixtures thereof, in particular those of styrene and acrylonitrile in a weight ratio of 90:10 to 50:50.

The graft yield, i.e. the ratio of the weight of grafted-on monomer (or the weight of the graft sheath) to the weight of the grafting monomers used, is in general from 20 to 80% by weight, preferably from 40 to 80% by weight. The graft yield is determined as described by M. Hoffmann, H. Krömer and R. Kuhn in Polymeranalytik, volume 1, Georg-Thieme-Verlag Stuttgart 1977.

Graft rubbers (B) based on polyacrylates which are usable according to the present invention are described for example in DE-B-24 44 584 (US-A-4 022 748) and DE-A-27 26 256 (US-A-4 096 202).

The elastomeric graft polymers (B) which are usable according to the present invention are advantageously formed from, based on the total weight of (B),
B1) from 50 to 90% by weight, preferably from 60 to 80% by weight, of the grafting base (B1) and
B2) from 10 to 50% by weight, preferably from 20 to 40% by weight, of the graft superstratum (B2).

It will be understood that the elastomeric graft polymers (B) can also be mixtures of the types described above.

C) Formative component (C) of the thermoplastic molding materials according to the present invention comprises, as mentioned above, from 5 to 75 parts by weight, preferably from 10 to 60 parts by weight, in particular from 10 to 40 parts by weight, based on 100 parts by weight of the molding material, of one or more, preferably one, copolymer (C) prepared by copolymerization of, based on the total weight of (C),
C1) from 55 to 90% by weight, preferably from 60 to 90% by weight, in particular from 75 to 90% by weight, of α-methylstyrene and
C2) from 10 to 45% by weight, preferably from 10 to 40% by weight, in particular from 10 to 25% by weight, of acrylonitrile or methacrylonitrile or a mixture of acrylonitrile and methacrylonitrile.

The weight ratio of acrylonitrile to methacrylonitrile in the mixture can vary within wide limits. If mixtures of the type mentioned are used, the weight ratios of acrylonitrile to methacrylonitrile are advantageously within the range from 90:10 to 10:90, preferably from 90:10 to 50:50. Instead of α-methylstyrene it is also possible to use mixtures of α-methylstyrene and styrene and/or other substituted styrenes, e.g. p-methylstyrene, to prepare the copolymers (C), subject to the proviso that the mixture contains more than 50% by weight, based on the total weight, of α-methylstyrene.

Such copolymers can be prepared for example by the processes described in DE-B-10 01 001 and DE-B-10 03 436 or they may be acquired as commercial products. The weight average molecular weight of the copolymers (C) determined by light scattering is preferably within the range from 50,000 to 500,000, in particular from 70,000 to 250,000.

To prepare the thermoplastic molding materials according to the present invention it is advantageous (subject to the specified weights to use the elastomeric graft copolymers (B) and copolymers (C) in such amounts that the weight ratio of (B):(C) comes to lie within the range from 1:3 to 3:1, preferably from 1:2 to 2:1, in particular from 1:1.5 to 1.5:1.

D) As mentioned, the novel thermoplastic molding materials contain as their distinguishing feature from 0.1 to 5 parts by weight, preferably from 0.2 to 4 parts by weight, in particular from 0.5 to 3 parts by weight, based on 100 parts by weight of the molding material, of one or more, preferably one, copolymer (D) prepared by copolymerization of, based on the total weight of (D),
D1) from 60 to 99% by weight, preferably from 70 to 95% by weight, in particular from 75 to 90% by weight, of styrene and
D2) from 1 to 40% by weight, preferably from 5 to 30% by weight, in particular from 10 to 25 % by weight, of one or more preferably one, olefinically unsaturated monomer which contains at least one selected functional group.

Suitable functional groups according to the present invention are: the carboxyl groups; the tert-butyl ester group, which under the reaction conditions of molding material preparation is split to form a carboxyl group; the hydroxyl group; the amino group; and preferably the carboxylic anhydride group.

Suitable copolymers (D) also include those copolymers where up to 90% by weight, preferably up to 70% by weight, in particular less than 50% by weight, based on the weight of (D2), of the olefinically unsaturated monomers (D2) has been replaced by acrylonitrile.

Examples of suitable olefinically unsaturated monomers (D2) are: olefinically unsaturated dicarboxylic acids, e.g. maleic acid, fumaric acid and itaconic acid, and the corresponding dicarboxylic mono- and/or di-tert-butyl esters, olefinically unsaturated monocarboxylic acids, e.g. acrylic acid and methacrylic acid, and the corresponding tert-butyl (meth)acrylates, olefinically unsaturated carboxylic anhydrides, e.g. maleic anhydride, and (meth)acrylates of the formulae

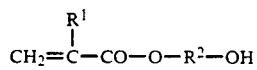  (I)

and

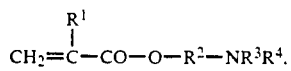  (II)

where
$R^1$ is hydrogen or methyl,
$R^2$ is branched or preferably linear alkylene of from 2 to 16, preferably from 2 to 4, carbon atoms, and
$R^3$ and $R^4$, which may be identical to or different from each other, are each hydrogen or linear or branched alkyl of from 1 to 8, preferably 1 or 2, carbon atoms.

Examples of suitable (meth)acrylates of the formulae (I) and (II) are: hydroxyethyl methacrylate, hydroxypropyl acrylate and N,N'-dimethylaminoethyl acrylate.

Particularly suitable and hence preferred copolymers (D) are styrene copolymers containing maleic anhydride units.

E) In addition to the essential components (A) to (D) the molding materials according to the present invention may also contain reinforcing fillers (E) and/or additives. As mentioned, these additives may be introduced via the TPUs (A), blended with one or more of the formative components (A) to (D) or be directly incorporated into the reaction mixture in the course of the preparation of the molding materials according to the present invention.

The proportion of reinforcing fillers, used individually or as mixtures, is, based on 100 parts by weight of the molding materials, customarily from 0 to 60 parts by weight, preferably from 2 to 50 parts by weight, in particular from 5 to 30 parts by weight.

Suitable reinforcing fillers are for example: organic fillers, such as carbon black, chlorinated polyethylenes and melamine, and inorganic fillers such as wollastonite, calcium carbonate, magnesium carbonate, amorphous silica, calcium silicate, calcium metasilicate, quartz powder, talc, kaolin, mica, feldspar, glass spheres, silicon nitride, boron nitride and mixtures thereof.

Particularly suitable reinforcing fillers which are therefore preferred are fibers, for example carbon fibers or in particular glass fibers, in particular when a high heat resistance or very high stiffness is required, with or without an adhesion promoting or/and size finish. Suitable glass fibers, which are also for example in the form of glass weaves, mats, webs and/or preferably glass filament rovings or chopped glass filament formed from low-alkali E-glasses from 5 to 200 lm, preferably from 6 to 15 lm, in diameter, generally have a mean fiber length of from 0.05 to 1 mm, preferably from 0.1 to 0.5 mm, after incorporation into the molding materials.

As mentioned, the thermoplastic molding materials according to the present invention or the TPUs (A) and/or the other formative components (B) to (D) used for this purpose may also incorporate additives. If such materials are used, their proportion, based on 100 parts by weight of the molding material, is in general up to 40 parts by weight, preferably up to 10 parts by weight, in particular from 0.01 to 5 parts by weight. Examples of such additives are: flame retardants, nucleating agents, antioxidants, stabilizers, lubricants, demolding agents and dyes.

Suitable flame retardants are for example: melamine, polyhalobiphenyl, polyhalodiphenyl ether, polyhalophthalic acid and derivatives thereof, polyhalooligocarbonates and polyhalopolycarbonates, of which the corresponding bromine compounds are particularly effective. Suitable flame retardants also include phosphorus compounds, such as elemental phosphorus or organic phosphorus compounds. In addition the flame retardants generally contain a synergist, for example antimony trioxide.

The nucleating agents used can be for example talc, calcium fluoride, sodium phenylphosphinate, aluminum oxide and finely divided polytetrafluoroethylene in an amount of up to 5% by weight, based on 100 parts by weight of the molding material.

Suitable antioxidants and heat stabilizers which may be added to the molding materials according to the present invention are for example halides of metals of group I of the periodic table, for example halides of sodium, potassium or lithium, alone or combined with copper(I) halides, e.g. chlorides, bromides or iodides, sterically hindered phenols, hydroquinones and also substituted compounds of these groups and mixtures thereof, which are preferably used in concentrations of up to 1% by weight, based on 100 parts by weight of the molding material.

Examples of UV stabilizers are various substituted resorcinols, salicylates, benzotriazoles and benzophenones and also sterically hindered amines, which in general are used in amounts of up to 2.0% by weight, based on 100 parts by weight of the molding material.

Lubricants and demolding agents which in general are likewise added in amounts of up to 1% by weight, based on 100 parts by weight of the molding material, are stearic acids, stearyl alcohol, stearic esters and stearamides, and also the fatty acid esters of pentaerythritol.

It is also possible to add organic dyes, e.g. nigrosine, and pigments, e.g. titanium dioxide, cadmium sulfide, cadmium sulfide selenide, phthalocyanines, ultramarine blue or carbon black.

The thermoplastic molding materials according to the present invention can be prepared by any known method for forming an essentially homogeneous composition from the formative components (A) to (D) and optionally (E). For example, the formative components can be mixed at from 0° to 150° C., preferably at from 15° to 30° C., and then melted, or the components can be mixed directly in the melt. Alternatively, (A) can be mixed with (E) and this mixture be incorporated into the other formative components.

The thermoplastic molding materials according to the present invention are prepared at from 190° to 250° C., preferably from 210° to 240° C., in the course of a residence time of from 0.5 to 10 minutes, preferably of from 0.5 to 3 minutes, in for example the fluent, softened or preferably molten state of formative components (A) to (D), for example by stirring, rolling, kneading or preferably extruding, using for example customary plasticating apparatus, e.g. Brabender or Banbury mills, kneaders and extruders, preferably a twin-screw extruder or a mixing extruder for transfer molding.

In the most convenient and therefore preferable method of preparation, (A) to (D) are mixed and melted together at 190°-250° C., preferably in an extruder, the melt optionally has incorporated into it the component (E) and is then cooled, and the resulting molding material is comminuted.

The thermoplastic molding materials according to the present invention are easy to process into shaped articles possessing good surface properties and improved impact toughness combined with high stiffness, in particular at low temperatures, without separation into components occurring in the melt or in the molding.

The molding materials according to the present invention are preferably used for producing shaped articles, in particular large injection moldings for motor vehicles, preferably automotive exterior parts such as bumpers, front skirts, rear spoilers and rubbing strips. They are also suitable for automotive interior parts, such as dashboard trims, arm rests and handles.

EXAMPLES

Thermoplastic molding materials according to the present invention were prepared using the following thermoplastic polyurethanes (A):

- A1: TPU having a Shore D hardness of 74 prepared by reaction of a mixture of 0.5 mol of 1,4-butanediol polyadipate of molecular weight 2000 and 5.86 mol of 1,4-butanediol with 4,4'-diphenylmethane diisocyanate in an NCO:OH group ratio of 1 at 80°-170° C. by the belt technique.
- A2: TPU having a Shore D hardness of 74 prepared in the same way as A1 except that the NCO:OH group ratio used was 1.04.
- A3: TPU having a Shore D hardness of 64 prepared in the same way as A1 except that 3.87 mol of 1,4-butanediol were used.
- A4: TPU having a Shore D hardness of 90 prepared in the same way as A1, except that 1.7 mol of 1,4-butanediol were used.
- A5: TPU having a Shore D hardness of 74 prepared by reacting a mixture of 0.5 mol of 1,4-butanediol-/ethylene glycol polyadipate having a 1,4-butanediol:ethylene glycol molar ratio of 1:1 and a molecular weight of 2000 and 5.66 mol of 1,4-butanediol with 4,4'-diphenylmethane diisocyanate in an NCO:OH group ratio of 1.

The above-described TPUs A1 to A5 each contain, based on the alkanediol polyadipate weight, 1% by weight of diisopropylphenylcarbodiimide as hydrolysis stabilizer.

- A6: TPU having a Shore D hardness of 74 prepared by reaction of a mixture of 1 mol of polyoxytetramethylene glycol of molecular weight 1000 and 5.9 mol of 1,4-butanediol with 4,4'-diphenylmethane diisocyanate in an NCO:OH group ratio of 1 at 90°-170° C. by the belt technique.

B: The graft polymers used were:
- B1: Elastomeric graft polymer having a grafting base (75% by weight) of poly-n-butyl acrylate crosslinked with 0.5% by weight of butanediol diacrylate, and a graft superstratum (25% by weight) of a copolymer of styrene and acrylonitrile in a weight ratio of 75:25, prepared by emulsion polymerization in a conventional manner. The median particle diameter $d_{50}$, defined as the diameter which is respectively less than and greater than the diameter possessed by 50% of the particles, was 450 nm.
- B2: Elastomeric graft polymer having a grafting base (75% by weight) of polybutadiene and a graft superstratum (25% by weight) of a copolymer of styrene and acrylonitrile in the weight ratio of 75:25, prepared by emulsion polymerization in a conventional manner. The median particle diameter $d_{50}$ was 250 nm.
- B3: Elastomeric graft polymer prepared in the same way as B2, except that the graft superstratum comprises a copolymer of α-methylstyrene and acrylonitrile in a weight ratio of 75:25.
- B4: Elastomeric graft polymer having a grafting base (70% by weight) of polybutadiene and a two-stage graft superstratum (in total 30% by weight), the 1st stage (10% by weight) being polystyrene and the 2nd stage (20% by weight) being a copolymer of methyl methacrylate, n-butyl acrylate and glycidyl methacrylate in a weight ratio of 89:10:1. The graft polymer, which was prepared by emulsion polymerization in a conventional manner, had a median particle diameter $d_{50}$ of 240 nm.

C: The α-methylstyrene/acrylonitrile copolymers used were
- C1: α-Methylstyrene/acrylonitrile copolymer prepared from α-methylstyrene and acrylonitrile in a weight ratio of 65:35, having a viscosity number of 80, measured in 0.5% strength by weight in dimethylformamide at 25° C. using a capillary viscometer.
- C2: α-Methylstyrene/acrylonitrile copolymer prepared in the same way as C1 but having a viscosity number of 60, measured in the same way as in C1.
- C3: α-Methylstyrene/acrylonitrile copolymer prepared from α-methylstyrene and acrylonitrile in the weight ratio of 70:30, having a viscosity number of 58, measured in the same way as in C1.

D: The copolymers of styrene and an olefinically unsaturated monomer having at least one functional group used were:
- D1: A styrene/maleic anhydride copolymer containing 24% by weight maleic anhydride units, based on the total weight, and having a viscosity number of 78, measured in the same way as in C1.
- D2: A styrene/acrylonitrile/maleic anhydride copolymer comprising 70% by weight of styrene, 26% by weight of acrylonitrile, 4% by weight of maleic anhydride units, based on the total weight, and having a viscosity number of 83, measured in the same way as in C1.

E: The reinforcing filler used was E-glass fiber in the form of rovings or chopped fiber, having a diameter of 10 μm.

EXAMPLES 1 TO 16 AND COMPARATIVE EXAMPLES I TO IV

To prepare the molding materials, the formative components (A) to (D) and the optional component (E) in the form of chopped fiber were intensively mixed at 23° C., the mixture was introduced into a twin-screw extruder and melted at 230° C., and the melt was homogenized for 2 minutes at the same temperature and then extruded into a water bath.

If rovings were used, they were added directly to the homogenized melt.

Following granulation and drying, the molding material was injection molded at 230° C. into test specimens on which measurements were carried out, without further aftertreatment, of the notched impact strength according to German Standard Specification DIN 53 453 and the modulus of elasticity according to German Standard Specification DIN 53 457.

The identity and quantity of the formative components used and the mechanical properties measured on the test specimens are summarized below in Tables 1 and 2.

We claim:

1. A thermoplastic molding material based on a TPU copolymer mixture and containing, based on 100 parts by weight,
   A) from 20 to 90 parts by weight of at least one thermoplastic polyurethane,
   B) from 1 to 40 parts by weight of at least one elastomeric graft copolymer formed from
      B1) a grafting base comprising an elastomeric polymer having a glass transition temperature of below −20° C. based on butadiene or an acrylate having from 1 to 10 carbon atoms in the alcohol moiety with or without a crosslinker and
      B2) a graft superstratum prepared by single- or multistage copolymerization of styrene, α-methylstyrene, acrylonitrile, methacrylonitrile and methyl methacrylate or of a mixture of at least two of said monomers,
   C) from 5 to 75 parts by weight of at least one copolymer prepared by copolymerization of, based on the total weight of (C),
      C1) from 55 to 90% by weight of α-methylstyrene and
      C2) from 10 to 45% by weight of acrylonitrile or methacrylonitrile or a mixture thereof,

TABLE 1

| | TPU (A) | | Graft polymer B | | α-Methylstyrene copolymer C | | Styrene copolymer D | | Mechanical properties | | |
|---|---|---|---|---|---|---|---|---|---|---|---|
| | Amount [parts by weight] | Type | Amount [parts by weight] | Type | Amount [parts by weight] | Type | Amount [parts by weight] | Type | Modulus of elasticity [N/mm²] | Notched impact strength −20° C. [KJ/m²] | −30° C. [KJ/m²] |
| Examples | | | | | | | | | | | |
| 1 | 60 | A1 | 20 | B2 | 19 | C3 | 1 | D1 | 590 | 60 | 15 |
| 2 | 60 | A2 | 20 | B2 | 19 | C3 | 1 | D1 | 580 | o.Br.* | 18 |
| 3 | 60 | A3 | 20 | B2 | 19 | C3 | 1 | D1 | 710 | 44 | 11 |
| 4 | 60 | A4 | 20 | B1 | 19 | C3 | 1 | D1 | 380 | o.Br. | 36 |
| 5 | 60 | A5 | 20 | B3 | 19 | C3 | 1 | D1 | 620 | 45 | 12 |
| 6 | 60 | A6 | 20 | B4 | 19 | C3 | 1 | D1 | 550 | o.Br. | 22 |
| 7 | 75 | A1 | 10 | B1 | 14 | C1 | 1 | D1 | 405 | o.Br. | 26 |
| 8 | 75 | A1 | 10 | B2 | 14 | C3 | 1 | D1 | 400 | o.Br. | 23 |
| 9 | 85 | A1 | 7 | B3 | 7 | C3 | 1 | D1 | 370 | o.Br. | 41 |
| 10 | 60 | A1 | 20 | B4 | 19 | C3 | 1 | D2 | 600 | 55 | 14 |
| 11 | 60 | A1 | 20 | B1 | 19 | C3 | 1 | D2 | 610 | 53 | 12 |
| 12 | 60 | A1 | 20 | B2 | 19.5 | C2 | 0.5 | D1 | 560 | 49 | 12 |
| 13 | 60 | A1 | 20 | B2 | 18 | C2 | 2 | D1 | 600 | 62 | 16 |
| Comparative examples | | | | | | | | | | | |
| I | 60 | A1 | 20 | B2 | 20 | C3 | — | — | 550 | 54 | 9 |
| II | 60 | A3 | 20 | B2 | 20 | C3 | — | — | 600 | 23 | 6 |
| III | 60 | A6 | 20 | B4 | 20 | C3 | — | — | 500 | 55 | 16 |

*no fracture

TABLE 2

| | TPU (A) | | Graft polymer B | | α-Methylstyrene copolymer C | | Styrene copolymer D | | Reinforcing Agent E | Mechanical properties | | |
|---|---|---|---|---|---|---|---|---|---|---|---|---|
| | Amount [parts by weight] | Type | Amount [parts by weight] | Type | Amount [parts by weight] | Type | Amount [parts by weight] | Type | [parts by weight] | Modulus of elasticity [N/mm²] | Notched impact strength −20° C. [KJ/m²] | −30° C. [KJ/m²] |
| Examples | | | | | | | | | | | | |
| 14 | 48 | A1 | 16 | B2 | 15 | C3 | 1 | D1 | 20 | 3700 | 32 | 11 |
| 15 | 48 | A4 | 16 | B2 | 15 | C3 | 1 | D1 | 20 | 3200 | 41 | 14 |
| 16 | 48 | A6 | 16 | B2 | 15 | C3 | 1 | D2 | 20 | 3400 | 36 | 15 |
| Comparative Example | | | | | | | | | | | | |
| IV | 48 | A1 | 16 | B2 | 16 | C3 | — | — | 20 | 3600 | 28 | 8 |

D) from 0.1 to 5 parts by weight of at least one copolymer prepared by copolymerization of, based on the total weight of (D),
  D1) from 60 to 99% by weight of styrene and
  D2) from 1 to 40% by weight of at least one olefinically unsaturated monomer having at least one carboxyl, anhydride, tert-butyl ester, hydroxyl or amino group, and
E) from 0 to 60 parts by weight of at least one reinforcing filler.

2. A thermoplastic molding material based on a TPU copolymer mixture consisting of, based on 100 parts by weight,
A) from 20 to 90 parts by weight of at least one thermoplastic polyurethane,
B) from 1 to 40 parts by weight of an elastomeric graft copolymer formed from
  B1) a grafting base comprising an elastomeric polymer having a glass transition temperature of below $-20°$ C. based on butadiene or an acrylate having from 1 to 10 carbon atoms in the alcohol moiety with or without a crosslinker and
  B2) a graft superstratum prepared by single- or multistage copolymerization of styrene, α-methylstyrene, acrylonitrile, methacrylonitrile and methyl methacrylate or of a mixture of at least two of said monomers,
C) from 5 to 75 parts by weight of a copolymer prepared by copolymerization of, based on the total weight of (C),
  C1) from 55 to 90% by weight of α-methylstyrene and
  C2) from 10 to 45% by weight of acrylonitrile or methacrylonitrile or a mixture thereof,
D) from 0.1 to 5 parts by weight of a copolymer prepared by copolymerization of, based on the total weight of (D),
  D1) from 60 to 99% by weight of styrene and
  D2) from 1 to 40% by weight of at least one olefinically unsaturated monomer having at least one carboxyl, anhydride, tert-butyl ester, hydroxyl or amino group, and
E) from 0 to 60 parts by weight of at least one reinforcing filler.

3. A thermoplastic molding material as claimed in claim 1 or 2, wherein the elastomeric graft polymer (B) is formed from, based on the total weight of (B),
  B1) from 50 to 90% weight of the grafting base (B1) and
  B2) from 10 to 50% by weight of the graft superstratum (B2).

4. A thermoplastic molding material as claimed in claim 1 or 2, wherein up to 90% by weight of the olefinically unsaturated monomer (D2) has been replaced by acrylonitrile.

5. A thermoplastic molding material as claimed in claim 1 or 2, wherein the olefinically unsaturated monomer (D2) is selected from the group consisting of maleic acid, fumaric acid, acrylic acid, methacrylic acid, itaconic acid, the corresponding tert-butyl esters, maleic anhydride and (meth)acrylates of the formulae

and

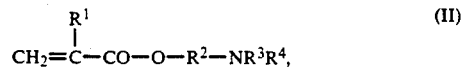

where
$R^1$ is hydrogen or methyl,
$R^2$ is linear or branched alkylene of from 2 to 16 carbon atoms, and
$R^3$ and $R^4$, which may be identical to or different from each other, are each hydrogen or alkyl of from 1 to 8 carbon atoms.

6. A thermoplastic molding material as claimed in claim 1 or 2, wherein the olefinically unsaturated monomer (D2) is maleic anhydride.

7. A thermoplastic molding material as claimed in claim 1 or 2, wherein the thermoplastic polyurethane elastomer (A) is prepared by reacting
  a) an organic diisocyanate with
  b) a polyhydroxy compound having a molecular weight of from 500 to 8000 and
  c) a diol having a molecular weight of from 60 to 400 in an equivalence ratio of NCO groups of organic diisocyanate (a) to the sum total of hydroxyl groups of components (b) and (c) of from 0.8:1.0 to 1.2:1.0.

8. A thermoplastic molding material as claimed in claim 1 or 2 or, wherein the thermoplastic polyurethane elastomer (A) is prepared by reacting
  a) an aromatic diisocyanate, with
  b) an essentially linear polyhydroxy compound, preferably a polyalkylene glycol polyadipate having from 2 to 6 carbon atoms in the alkylene moiety and a molecular weight of from 500 to 600 or a hydroxyl-containing polytetrahydrofuran having a molecular weight of from 500 to 3500, and
  c) 1,4-butanediol.

9. A thermoplastic molding material as claimed in claim 1 or 2, wherein the thermoplastic polyurethane elastomer (A) is prepared by the belt technique.

10. A process for preparing a thermoplastic molding material as claimed in claim 1 or 2 or 9 by melting together components (A) to (D) with or without (E) in an extruder, at 190°–250° C. in the course of a residence time of from 0.5 to 10 minutes.

11. A method of using a thermoplastic molding material based on a TPU copolymer mixture as claimed in claim 1 or 2 for producing injection moldings.

12. The thermoplastic molding material of claim 8 wherein said aromatic diisocyanate is 4,4'-diphenylmethane diisocyanate.

* * * * *